United States Patent
Recker et al.

(10) Patent No.: US 7,937,936 B2
(45) Date of Patent: May 10, 2011

(54) VEHICLE EXHAUST COMPONENT ARRANGEMENT

(75) Inventors: Robert James Recker, Waterloo, IA (US); Christopher Adam Bering, Waterloo, IA (US); Kirby Jon Baumgard, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 149 days.

(21) Appl. No.: 11/654,203

(22) Filed: Jan. 16, 2007

(65) Prior Publication Data
US 2008/0168764 A1   Jul. 17, 2008

(51) Int. Cl.
*F01N 3/00* (2006.01)

(52) U.S. Cl. ............. 60/297; 60/272; 60/283; 60/299; 60/301; 60/311; 220/4.12; 220/4.14; 220/581; 220/DIG. 24; 180/89.12; 180/309; 180/314; 180/900

(58) Field of Classification Search ............ 60/297, 60/311, 272, 282, 283, 295, 299, 301; 180/89.2, 180/309, 311, 314, 900, 89.1, 89.12; 220/4.12, 220/4.14, 581, 587, DIG. 24
See application file for complete search history.

(56) References Cited

U.S. PATENT DOCUMENTS

| | | | | |
|---|---|---|---|---|
| 4,506,756 A * | 3/1985 | Bergous | | 180/291 |
| 4,696,366 A * | 9/1987 | Hattori | | 180/296 |
| 4,909,530 A * | 3/1990 | Tsukada et al. | | 180/296 |
| 4,964,383 A | 10/1990 | Shinno et al. | | |
| 5,152,364 A * | 10/1992 | Woods et al. | | 180/292 |
| 6,378,645 B1 | 4/2002 | Uegane et al. | | |
| 6,862,879 B2 | 3/2005 | Upadhyay et al. | | |
| 6,877,313 B1 | 4/2005 | Phillips et al. | | |
| 6,907,858 B2 | 6/2005 | Miura | | |
| 7,017,338 B2 * | 3/2006 | van Nieuwstadt | | 60/297 |
| 7,237,644 B2 * | 7/2007 | Matsumoto et al. | | 180/309 |
| 2003/0110761 A1 | 6/2003 | Minami | | |
| 2005/0022778 A1 | 2/2005 | Miura | | |
| 2005/0050884 A1 | 3/2005 | Nagaoka et al. | | |
| 2005/0091970 A1 | 5/2005 | Nieuwstadt | | |
| 2008/0185133 A1 * | 8/2008 | Mabuchi et al. | | 165/168 |

FOREIGN PATENT DOCUMENTS

| | | | | |
|---|---|---|---|---|
| DE | 004244323 A1 * | 6/1994 | | 180/68.3 |
| JP | 02008025207 A * | 2/2008 | | 60/272 |

* cited by examiner

*Primary Examiner* — Binh Q Tran

(57) ABSTRACT

An exhaust component arrangement is provided for an off-road vehicle having an engine, a cab, a transmission connected to the engine, and a fuel tank adjacent the transmission. A portion of the fuel tank is positioned below a portion of the cab. The exhaust component arrangement includes a particulate filter unit, a NOx reduction unit, and an oxidation catalyst unit, all connected in series. The fuel tank has a recess formed in an upper surface thereof. A lower portion of one of the units is received in the recess. Preferably, a lower portion of the NOx reduction unit is received in the recess.

8 Claims, 2 Drawing Sheets

VEHICLE EXHAUST COMPONENT ARRANGEMENT

BACKGROUND

The present invention relates to an exhaust treatment component arrangement for an off-road vehicle such as an agricultural tractor.

Tier 4 interim emissions standards, which are expected to take effect for off-highway vehicles in 2011, will require all off-highway vehicles to manage Particulate Matter (PM) and NOx levels. It is expected that this will require some combination of engine control and after-treatment devices. In 2014, it is expected that final Tier 4 regulations will require further NOx reductions. Presently, it appears that both a diesel particulate filter and some sort of NOx reduction device will be required in 2014.

U.S. Pat. No. 7,017,338, issued 28 Mar. 2006 to Nieuwstadt, shows a diesel emissions control system which includes an oxidation catalyst, a particulate filter and a NOx aftertreatment catalyst, all connected in series upstream of a muffler. U.S. Pat. No. 6,907,858, issued 21 Jun. 2005 to Miura, shows a diesel engine which includes an oxidation catalyst, NOx trapping catalytic converter and a diesel particulate filter, all connected in series. However, such exhaust treatment devices are quite large—with total volumes of about 10 times the engine displacement, and neither of these patents shows how to arrange these large components on a vehicle without interfering with operator vision.

SUMMARY

Accordingly, an object of this invention is to provide an arrangement of exhaust treatment devices in a vehicle which meets emission standards and which maintains visibility.

This and other objects are achieved by the present invention, wherein an exhaust treatment component arrangement is provided for an off-road vehicle having an engine, a transmission mounted between the engine and a cab, and a fuel tank adjacent the cab, rearward of the engine and transmission, and below a portion of the cab. The exhaust component arrangement includes a oxidation catalyst positioned rearwardly of the engine and above the transmission, and a first exhaust pipe communicating exhaust from the engine to the oxidation catalyst. The first exhaust pipe extends generally rearwardly from the engine to the oxidation catalyst. A particulate filter is positioned rearwardly and preferably below the oxidation catalyst, and is positioned in front of a lower portion of the cab. A second exhaust pipe communicates exhaust from the oxidation catalyst to the particulate filter. A NOx reduction unit is preferably positioned below and to one side of the particulate filter and positioned below a front portion of the cab and above a portion of the fuel tank. The fuel tank has a recess in an upper surface thereof. A lower portion of the NOx reduction unit is at least partially received in the recess. A third exhaust pipe communicates exhaust from the particulate filter to the NOx reduction unit. A fourth exhaust pipe communicates exhaust from the NOx reduction unit to the environment.

DETAILED DESCRIPTION

Figure 1:
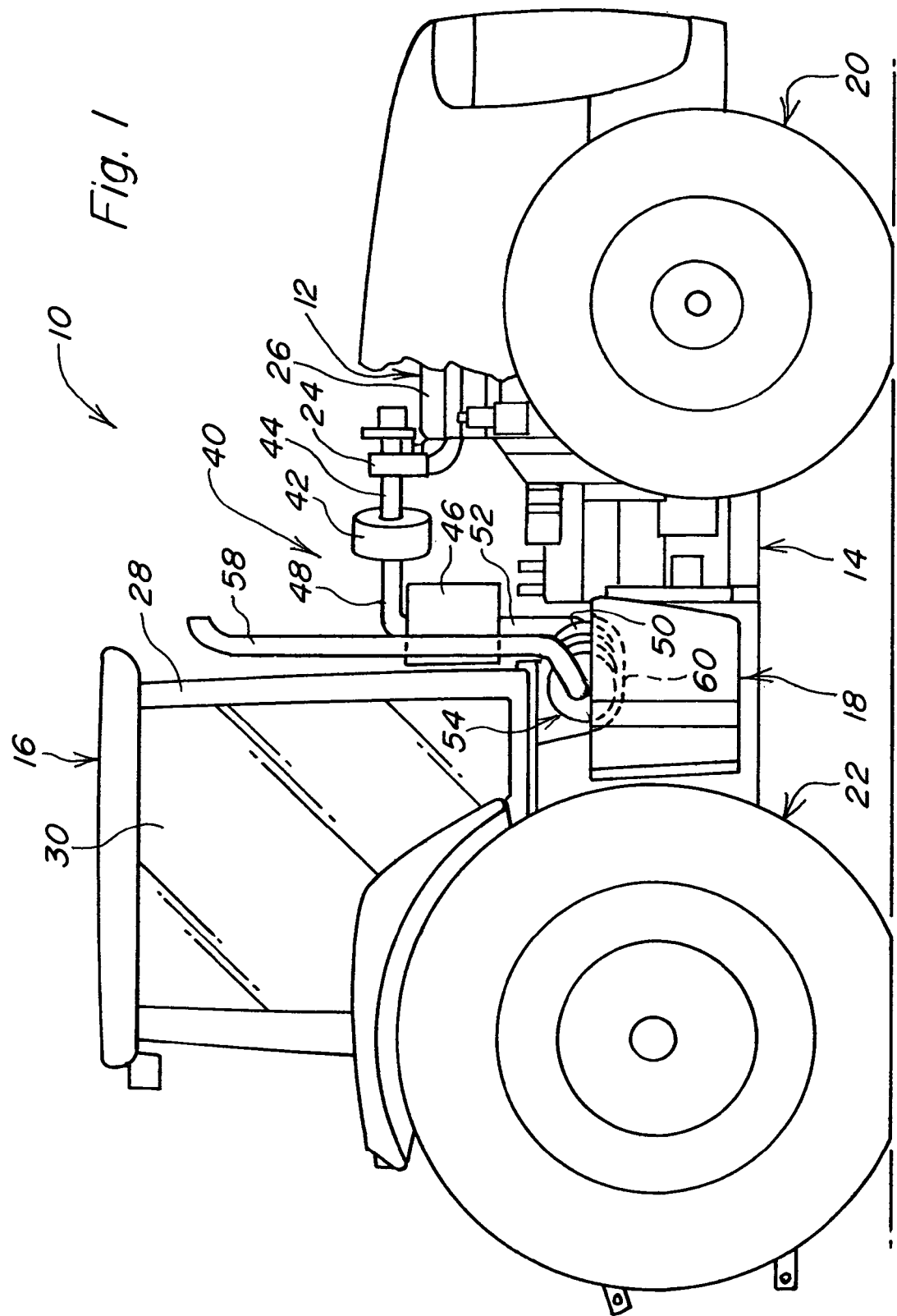
FIG. 1 is a side view of a tractor embodying the exhaust treatment component arrangement of the present invention.
Figure 2:
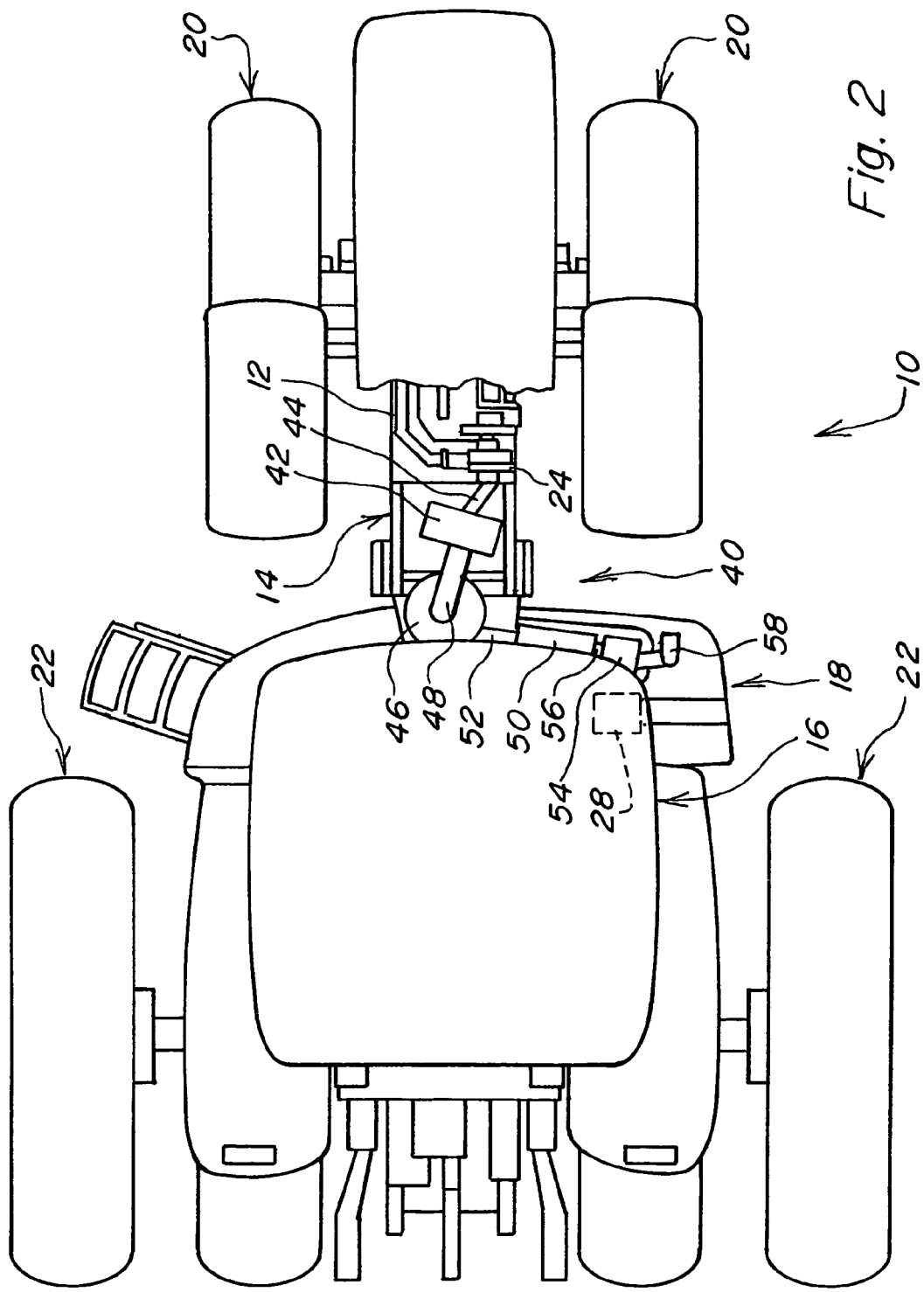
FIG. 2 is a top view of the tractor of FIG. 1.

Referring to FIGS. 1 and 2, a vehicle or tractor 10 has an engine 12, a transmission 14, a cab 16, a fuel tank 18, front wheels 20 and rear wheels 22. As is conventional, the transmission 14 is positioned between the engine 12 and the cab 16. The fuel tank 18 is positioned below a front corner portion of the cab 16. As best seen in FIG. 2, the fuel tank 18 projects laterally to one side of the fore-and-aft centerline of the tractor 10. The engine 12 includes an exhaust turbine 24 which receives exhaust from an exhaust manifold 26. The cab 16 includes corner posts 28 which extend vertically adjacent the front edge of a side window 30.

The vehicle includes an exhaust treatment component arrangement 40. The exhaust treatment component arrangement 40 includes an oxidation catalyst 42 positioned rearwardly of the engine 12 and above the transmission 14. A first exhaust pipe 44 communicates exhaust from the exhaust turbine of the engine 12 to the oxidation catalyst 42. The first exhaust pipe 44 extends generally rearwardly from the engine 12 to the oxidation catalyst 42.

The exhaust treatment component arrangement 40 also includes a particulate filter 46 positioned rearwardly and below the oxidation catalyst 42, and positioned in front of a lower portion of the cab 16. A second exhaust pipe 48 communicates exhaust from the oxidation catalyst 42 to the particulate filter 46. Pipes 44 and 48 and/or oxidation catalyst 42 are preferably supported with respect to the transmission 14 by one or more brackets (not shown).

The exhaust treatment component arrangement 40 also includes a NOx reduction unit 50 positioned below and to one side of the particulate filter 46 and positioned below a front portion of the cab 16 and above the fuel tank 18. A third exhaust pipe 52 communicates exhaust from the particulate filter 46 to the NOx reduction unit 50.

The exhaust treatment component arrangement 40 also includes a second oxidation catalyst 54 positioned adjacent to and downstream of the NOx reduction unit 50. The second oxidation catalyst 54 is positioned below and to one side of the particulate filter 46 and positioned below a front portion of the cab 16 and above the fuel tank 18. A fourth exhaust pipe 56 communicated exhaust from the NOx reduction unit 50 to the second oxidation catalyst 54. Pipes 52 and 56 and/or units 50 and 54 are also preferably supported with respect to the tractor frame by one or more brackets (not shown).

A fifth exhaust pipe 58 communicates exhaust from the second oxidation catalyst 54 to the environment. The fifth exhaust pipe 58 extends upwardly adjacent to corner post 28 of the cab 16, and is preferably positioned and sized so as not to obscure the vision of an operator in the operator's seat (not shown) looking past the corner post 28.

A recess 60 is formed in an upper surface of the fuel tank 18. Lower portions of the NOx reduction unit 50 and the second oxidation catalyst 54 are received in the recess 60.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. An exhaust component arrangement for an off-road vehicle having an engine, a cab, a transmission connected to the engine, and a fuel tank adjacent the transmission, a portion of the fuel tank being positioned below a portion of the cab, the exhaust component arrangement comprising:
- a particulate filter unit;
- a NOx reduction unit; and
- an oxidation catalyst unit, said units being connected in series, the fuel tank having an upwardly opening recess formed in an upper surface thereof, and a lower portion of one of the units being received in said recess.

2. The exhaust component arrangement of claim 1, wherein:
- a lower portion of the NOx reduction unit is received in said recess.

3. An exhaust component arrangement for an off-road vehicle having an engine, a transmission mounted between the engine and a cab, and a fuel tank adjacent the cab, rearward of the engine and transmission, and below a portion of the cab, the exhaust treatment component arrangement comprising:
- a oxidation catalyst positioned rearwardly of the engine and above the transmission;
- a first exhaust pipe communicating exhaust from the engine to the oxidation catalyst, the first exhaust pipe extending generally rearwardly from the engine to the oxidation catalyst;
- a particulate filter positioned rearwardly and below the oxidation catalyst, and positioned in front of a lower portion of the cab;
- a second exhaust pipe communicating exhaust from the oxidation catalyst to the particulate filter;
- a NOx reduction unit positioned below and to one side of the particulate filter and positioned below a front portion of the cab and above the fuel tank;
- a third exhaust pipe communicating exhaust from the particulate filter to the NOx reduction unit; and
- a fourth exhaust pipe communicating exhaust from the NOx reduction unit to the environment.

4. The exhaust treatment component arrangement of claim 3, wherein:
- a recess is formed in an upper surface of the fuel tank; and
- a lower portion of the NOx reduction unit is received in said recess.

5. The exhaust treatment component arrangement of claim 3, wherein:
- the fourth exhaust pipe extends upwardly adjacent to a corner post of the cab without obscuring visibility adjacent said corner post.

6. An exhaust treatment component arrangement for an off-road vehicle having an engine, a transmission mounted between the engine and a cab, and a fuel tank adjacent the cab, rearward of the engine and transmission, and below a portion of the cab, the exhaust treatment component arrangement comprising:
- a oxidation catalyst positioned rearwardly of the engine and above the transmission;
- a first exhaust pipe communicating exhaust from the engine to the oxidation catalyst, the first exhaust pipe extending generally rearwardly from the engine to the oxidation catalyst;
- a particulate filter positioned rearwardly and below the oxidation catalyst, and positioned in front of a lower portion of the cab;
- a second exhaust pipe communicating exhaust from the oxidation catalyst to the particulate filter;
- a NOx reduction unit positioned below and to one side of the particulate filter and positioned below a front portion of the cab and above the fuel tank, the fuel tank having a recess in an upper surface thereof, and a lower portion of the NOx reduction unit being received in said recess;
- a third exhaust pipe communicating exhaust from the particulate filter to the NOx reduction unit; and
- a fourth exhaust pipe communicating exhaust from the NOx reduction unit to the environment.

7. An exhaust component arrangement for an off-road vehicle having an engine, a cab, a transmission connected to the engine, and a fuel tank adjacent the transmission, a portion of the fuel tank being positioned below a portion of the cab, the exhaust component arrangement comprising:
- a particulate filter unit, the particulate filter unit being positioned rearwardly and below the oxidation catalyst unit, and positioned in front of a lower portion of the cab;
- a NOx reduction unit, the NOx reduction unit being positioned below and to one side of the particulate filter unit and is positioned below a front portion of the cab and above the fuel tank;
- an oxidation catalyst unit, said units being connected in series, the fuel tank having a recess formed in an upper surface thereof, and a lower portion of one of the units being received in said recess, the oxidation catalyst unit being positioned rearwardly of the engine and above the transmission;
- a first exhaust pipe communicating exhaust from the engine to the oxidation catalyst unit, the first exhaust pipe extending generally rearwardly from the engine to the oxidation catalyst unit;
- a second exhaust pipe communicating exhaust from the oxidation catalyst unit to the particulate filter unit;
- a third exhaust pipe communicates exhaust from the particulate filter unit to the NOx reduction unit; and
- a fourth exhaust pipe communicates exhaust from the NOx reduction unit to the environment.

8. An exhaust component arrangement for an off-road vehicle having an engine, a cab, an exhaust pipe adjacent a front corner of the cab through which exhaust flows upwardly, a transmission connected to the engine, and a fuel tank adjacent the transmission, a portion of the fuel tank being positioned below a front corner portion of the cab, the exhaust component arrangement comprising:
- a particulate filter unit;
- a NOx reduction unit; and
- an oxidation catalyst unit, said units being connected in series, the fuel tank having an upwardly opening recess formed in only an upper surface thereof, and a lower portion of one of the units being received in said recess, said one unit being connected to the exhaust pipe.

* * * * *